(12) United States Patent
Nakagawa

(10) Patent No.: US 7,578,619 B2
(45) Date of Patent: Aug. 25, 2009

(54) LINEAR GUIDE AND UNDER SEAL

(75) Inventor: Takumi Nakagawa, Saitama (JP)

(73) Assignees: NSK Ltd., Tokyo (JP); NSK Precision Co., Ltd., Tokyo (JP)

( * ) Notice: Subject to any disclaimer, the term of this patent is extended or adjusted under 35 U.S.C. 154(b) by 0 days.

(21) Appl. No.: 11/094,354

(22) Filed: Mar. 31, 2005

(65) Prior Publication Data

US 2005/0238266 A1    Oct. 27, 2005

(30) Foreign Application Priority Data

Mar. 31, 2004   (JP)   ............ P.2004-106486

(51) Int. Cl.
*F16C 33/00*   (2006.01)
*F16C 29/06*   (2006.01)

(52) U.S. Cl. .................... 384/15; 384/45

(58) Field of Classification Search ......... 384/43–45, 384/15; 464/168

See application file for complete search history.

(56) References Cited

U.S. PATENT DOCUMENTS

| | | | | |
|---|---|---|---|---|
| 5,149,205 A | * | 9/1992 | Tsukada ............... | 384/15 |
| 5,324,116 A | * | 6/1994 | Agari ................... | 384/15 |
| 5,342,127 A | * | 8/1994 | Agari ................... | 384/15 |
| 5,358,336 A | * | 10/1994 | Agari ................... | 384/15 |
| 5,362,155 A | * | 11/1994 | Ichida .................. | 384/15 |
| 6,030,124 A | * | 2/2000 | Moseberg et al. ...... | 384/15 |
| 6,250,805 B1 | * | 6/2001 | Kuwahara ............. | 384/15 |
| 2003/0215166 A1 | * | 11/2003 | Matsumoto ........... | 384/15 |

* cited by examiner

*Primary Examiner*—Richard W L Ridley
*Assistant Examiner*—James Pilkington
(74) *Attorney, Agent, or Firm*—Sughrue Mion, PLLC

(57) ABSTRACT

A linear guide has an under seal which is arranged on an under surface of a slider main body along an axial direction, has an axial end portion held by an end cap, comes in slide contact with a guide rail, and seals the under surface of the slider main body. In the linear guide, the under seal has an elastic lip portion, in a portion of the under seal coming in contact with the slider main body, which has a length approximately equal to an axial length of the slider main body and elastically comes in contact with the slider main body.

4 Claims, 10 Drawing Sheets

LINEAR GUIDE AND UNDER SEAL

CROSS-REFERENCE TO RELATED APPLICATIONS

This application is based upon and claims the benefit of priority from the prior Japanese Patent Applications No. 2004-106486, filed on Mar. 31, 2004, the entire contents of which are incorporated herein by reference.

BACKGROUND OF THE INVENTION

1. Field of the Invention

The present invention relates to a linear guide used in e.g., an industrial machine field and an under seal attached to the linear guide.

2. Description of the Related Art

FIG. 16 shows a linear guide of a related art.

This linear guide has a guide rail 1 extending in an axial direction and a slider 2 laid across the guide rail 1 so as to relatively move on the guide rail 1 in the axial direction.

A rolling element rolling groove 3 extending in the axial direction is formed on each of both side faces of the guide rail 1. A rolling element rolling groove 7 opposed to the rolling element rolling groove 3 is formed on each of the inside faces of both sleeve portions 4 of a slider main body 2A of the slider 2. Many balls B as one example of a rolling element are rotatably mounted between both these rolling element rolling grooves 3 and 7 facing each other. The slider 2 can be relatively moved along the axial direction on the guide rail 1 through the rolling movements of these balls B.

As this movement is made, the ball B interposing between the guide rail 1 and the slider 2 rolls and moves to an end portion of the slider 2. However, it is necessary to infinitely circulate these balls B so as to continuously move the slider 2 in the axial direction.

Therefore, a rolling element passage 8 extending through the interior of the sleeve portion 4 of the slider main body 2A in the axial direction is formed. For example, an end cap 5 approximately formed in a U-shape is fixed to each of both ends of the slider main body 2A through a fixing means such as a screw 12, etc. A direction changing passage 6 curved in a semi-arc shape and communicating the rolling element passage 8 and a portion between both the above rolling element rolling grooves 3 and 7 is formed in this end cap 5. Thus, a rolling element infinite circulation orbiting path is formed. In FIG. 16, reference numeral 11 designates a side seal fixed to an end face of the slider main body 2A through a screw 12, etc. together with the end cap 5. Reference numeral 10 designates a tap hole of the screw 12 formed on the end face of the slider main body 2A. Reference numerals 13 and 14 respectively designate a nipple for grease supply, and a bolt insertion hole for fixing the guide rail 1.

An unillustrated inner seal and an under seal 15 are used as a member for sealing the portion between the slider 2 and the guide rail 1 in addition to the above side seal 11. The inner seal is arranged in a position opposed to both sides of the upper face of the guide rail 1 of the slider main body 2A. As shown in FIGS. 17 and 18, etc., the under seal 15 is arranged along the axial direction on an under surface of the slider main body 2A and comes in slide contact with the side face of the guide rail 1, and seals the under surface of the slider main body 2A.

The under seal 15 has a core bar 16 of a long plate shape long in the axial direction of the slider main body 2A, and a rubber seal 17 fixedly attached to this core bar 16. The under seal 15 is held by inserting its both end portions into holding grooves 19 (see FIG. 17) arranged in the end cap 5 in a state in which the under seal 15 is arranged on the under surface (see FIGS. 18 and 19) of the slider main body 2A, or is arranged in a storing concave portion 18 (see FIGS. 20 and 21) concavely arranged on the under surface. A sliding lip portion 20 formed at a width direction inside edge of the under seal 15 comes in slide contact with the side face of the guide rail 1 so that the under seal 15 seals the under surface of the slider main body 2A.

However, in the above related linear guide, the under seal 15 is held only by the holding groove 19 of the end cap 5. Therefore, the close attaching property to the slider main body 2A is weak and a gap is easily generated between the slider main body 2A and the under seal 15, and foreign matters, etc. easily enter from the gap.

Further, when the under seal 15 is arranged in the storing concave portion 18 (see FIGS. 20 and 21) concavely arranged on the under surface of the slider main body 2A, foreign matters, etc. are easily collected in a concave portion 21 formed between the under seal 15 and the under surface of the slider main body 2A.

The under seal 15 is directly fixed to the under surface of the slider main body 2A by a rivet 22 as a means for solving the above problems (see FIG. 22). However, when the under seal 15 is once fixed to the under surface of the slider main body 2A by the rivet 22, no under seal 15 can be easily detached. Further, it is necessary to process a hole of the rivet 22 in the slider main body 2A so that cost is increased. Furthermore, a problem exists in that it takes time and labor such as a rivet striking work at an assembling time of the under seal 15 and a rivet removing work, etc. at an exchanging time of the under seal 15.

Further, when the rivet 22 is strongly struck, the under seal 15 is excessively crushed by the rivet 22 so that the end portion and the intermediate portion of the under seal 15 are deformed in a wavy shape and a gap is easily generated between the under seal 15 and the slider main body 2A. Furthermore, an additional attachment space is required since the head of the rivet 22 is projected to the under surface of the slider main body 2A.

SUMMARY OF THE INVENTION

An object of the present invention is to provide a linear guide and an under seal which enable to prevent foreign matters from entering between the under seal and the slider main body and improve seal performance while setting a structure for holding the under seal by the end cap without using the rivet in the fixation of the under seal.

The invention provides a linear guide having a guide rail which has a first rolling element rolling groove extending in an axial direction; and a slider which has a second rolling element rolling groove opposed to the first rolling element rolling groove of the guide rail and is laid across the guide rail so as to relatively move along the axial direction through rolling movements of a plurality of rolling elements disposed between the first rolling element rolling groove and the second rolling element rolling groove, wherein the slider has: a slider main body which has a rolling element passage extending through the slider main body in the axial direction; an end cap which has a direction changing passage in a curved shape for communicating the rolling element passage and a passage formed by the first and second rolling element rolling grooves, and is fixed to an axial end portion of the slider main body; and an under seal which is arranged on an under surface of the slider main body along the axial direction, has an axial end portion held by the end cap, comes in slide contact with the guide rail, and seals the under surface of the slider main body, and the under seal has an elastic lip portion, in a portion of the under seal coming in contact with the slider main body, which has a length approximately equal to an axial length of the slider main body and elastically comes in contact with the slider main body.

Furthermore, the under seal has a core bar, and a convex step portion is arranged approximately in a central portion of the core bar.

The invention also provides a linear guide, having: a guide rail which has a first rolling element rolling groove extending in an axial direction; and a slider which has a second rolling element rolling groove opposed to the first rolling element rolling groove of the guide rail and is laid across the guide rail so as to relatively move along the axial direction through rolling movements of a plurality of rolling elements disposed between the first rolling element rolling groove and the second rolling element rolling groove, wherein the slider has: a slider main body which has a rolling element passage extending through the slider main body in the axial direction; an end cap which has a direction changing passage in a curved shape for communicating the rolling element passage and a passage formed by the first and second rolling element rolling grooves, and is fixed to an axial end portion of the slider main body; and an under seal which is arranged on an under surface of the slider main body along the axial direction, has an axial end portion held by the end cap, comes in slide contact with the guide rail, and seals the under surface of the slider main body, and the under seal has a core bar, and a convex step portion is arranged approximately in a central portion of the core bar.

The invention also provides an under seal arranged in a linear guide having a guide rail which has a first rolling element rolling groove extending in an axial direction; and a slider which has a second rolling element rolling groove opposed to the first rolling element rolling groove of the guide rail and is laid across the guide rail so as to relatively move along the axial direction through rolling movements of a plurality of rolling elements disposed between the first rolling element rolling groove and the second rolling element rolling groove, wherein the slider has a slider main body which has a rolling element passage extending through the slider main body in the axial direction; and an end cap which has a direction changing passage in a curved shape for communicating the rolling element passage and a passage formed by the first and second rolling element rolling grooves, and is fixed to an axial end portion of the slider main body, the under seal is arranged on an under surface of the slider main body along the axial direction, has an axial end portion held by the end cap, comes in slide contact with the guide rail, and seals the under surface of the slider main body, and the under seal has an elastic lip portion, in a portion of the under seal coming in contact with the slider main body, which has a length approximately equal to an axial length of the slider main body and elastically comes in contact with the slider main body.

Furthermore, the under seal has a core bar, and a convex step portion is arranged approximately in a central portion of the core bar.

The invention also provides an under seal arranged in a linear guide having a guide rail which has a first rolling element rolling groove extending in an axial direction; and a slider which has a second rolling element rolling groove opposed to the first rolling element rolling groove of the guide rail and is laid across the guide rail so as to relatively move along the axial direction through rolling movements of a plurality of rolling elements disposed between the first rolling element rolling groove and the second rolling element rolling groove, wherein the slider has a slider main body which has a rolling element passage extending through the slider main body in the axial direction; and an end cap which has a direction changing passage in a curved shape for communicating the rolling element passage and a passage formed by the first and second rolling element rolling grooves, and is fixed to an axial end portion of the slider main body, the under seal is arranged on an under surface of the slider main body along the axial direction, has an axial end portion held by the end cap, comes in slide contact with the guide rail, and seals the under surface of the slider main body, and the under seal has a core bar, and a convex step portion is arranged approximately in a central portion of the core bar.

In accordance with the present invention, the elastic lip portion arranged in a portion of the under seal coming in contact with the slider main body and having a length approximately equal to the axial length of the slider main body comes in contact with the slider main body with elastic force. Therefore, the close attaching property of the slider main body and the under seal is raised. Thus, it is possible to prevent a gap from being generated between the slider main body and the under seal and the invasion of foreign matters, etc. without fixing the under seal to the slider main body by a rivet.

When the under seal is arranged in a storing concave portion concavely arranged on the under surface of the slider main body, the elastic lip portion is arranged so as to cover this storing concave portion and the tip of this elastic lip portion comes in contact with the slider main body with elastic force so that the concave portion can be removed from the under surface of the slider main body. Thus, when the linear guide is particularly used upside down, etc., it is possible to prevent foreign matters, etc. from being collected in the above concave portion.

Further, the tip of the elastic lip portion arranged so as to cover the storing concave portion comes in contact with the slider main body with elastic force. Therefore, the close attaching property of the under seal and the slider main body is raised. Thus, it is possible to prevent a gap from being generated between the slider main body and the under seal and prevent the invasion of foreign matters, etc.

Further, in the present invention, the rigidity of the under seal is raised and the deformation of the under seal can be prevented by arranging the convex step portion approximately in the central portion of the core bar of the under seal. Thus, it is possible to prevent a gap from being generated between the slider main body and the under seal and prevent the invasion of foreign matters, etc.

Further, in the present invention, since the structure for holding the under seal by the end cap without using a rivet in the fixation of the under seal is adopted, the under seal is easily attached and detached from the slider main body. Further, it is possible to set cost of hole processing using the rivet attachment, assembly of the under seal, exchange, etc. to be unnecessary.

DETAILED DESCRIPTION OF THE PREFERRED EMBODIMENTS

Figure 1:
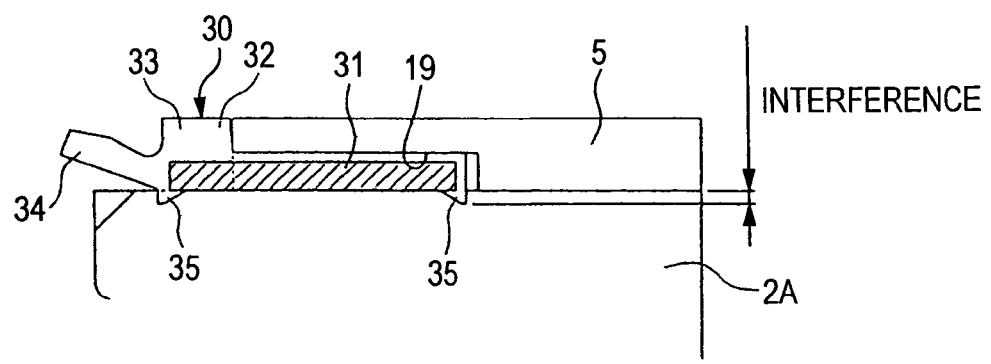
FIG. 1 is an enlarged sectional view for explaining the main portion of a linear guide in a first embodiment of the present invention.
Figure 2:
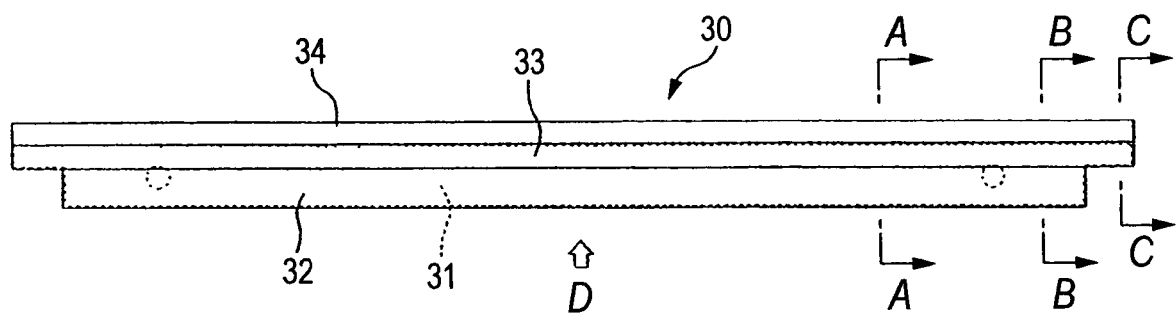
FIG. 2 is a plan view of an under seal.
Figure 3:
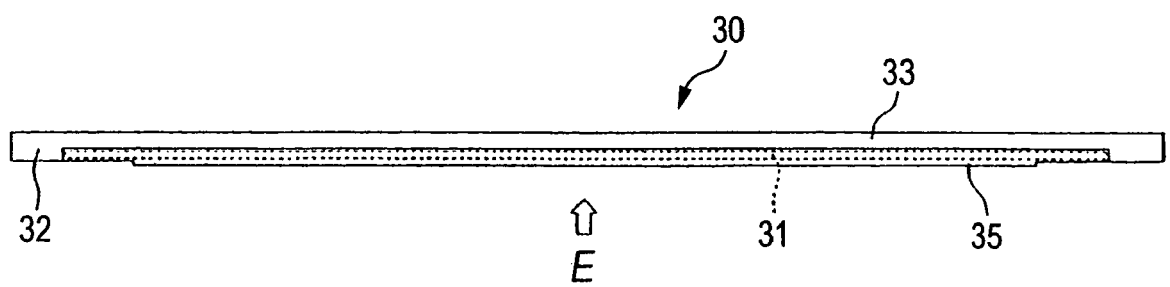
FIG. 3 is a view seen from the direction of an arrow D of FIG. 2.
Figure 4:
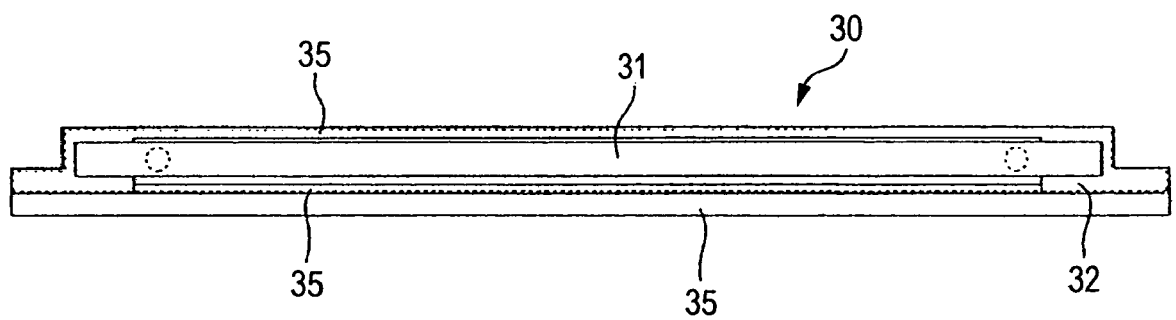
FIG. 4 is a view seen from the direction of an arrow E of FIG. 3.
Figure 5:
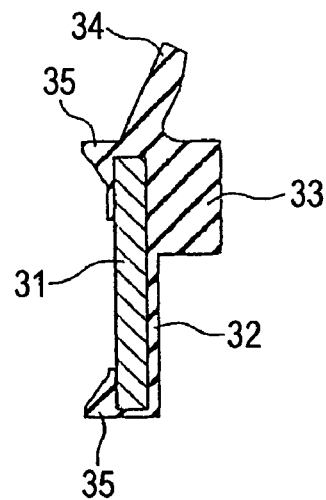
FIG. 5 is an A-A line enlarged sectional view of FIG. 2.
Figure 6:
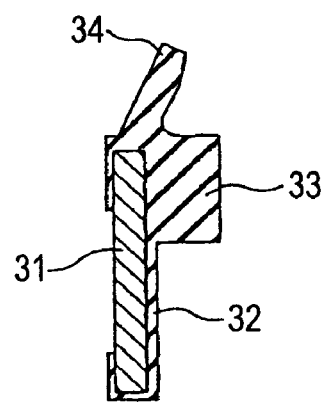
FIG. 6 is a B-B line enlarged sectional view of FIG. 2.
Figure 7:
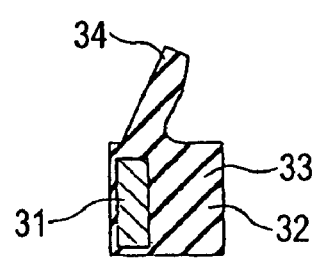
FIG. 7 is a C-C line enlarged sectional view of FIG. 2.

Embodiments of the present invention will be explained with reference to the drawings. FIG. 1 is an enlarged sectional view for explaining the main portion of a linear guide in a first embodiment of the present invention. FIG. 2 is a plan view of an under seal. FIG. 3 is a view seen from the direction of an arrow D of FIG. 2. FIG. 4 is a view seen from the direction of an arrow E of FIG. 3. FIG. 5 is an A-A line enlarged sectional view of FIG. 2. FIG. 6 is a B-B line enlarged sectional view of FIG. 2. FIG. 7 is a C-C line enlarged sectional view of FIG. 2. FIGS. 8 to 15 are views for explaining linear guides in other embodiments of the present invention. In each of the embodiments, portions overlapped or corresponding to those of the related linear guide already explained in FIGS. 16 to 21 are designated by the same reference numerals in each figure and their explanations are omitted.

First Embodiment

In the linear guide of the first embodiment of the present invention, with reference to FIGS. 1 to 7, an under seal 30 for sealing an under surface of a slider main body 2A in slide contact with the side face of a guide rail 1 has a core bar 31 of a long plate shape long in the axial direction of the slider main body 2A, and a rubber seal 32 fixedly attached to the core bar 31. Both end portions of the under seal 30 are inserted and held in a holding groove 19 arranged in an end cap 5 in a state arranged on the under surface of the slider main body 2A. A projecting stripe 33 extending along the axial direction of the slider main body 2A is formed on the width direction inside (guide rail 1 side) of the under seal 30. This projecting stripe 33 comes in contact with the end cap 5 so that the under seal 30 is positioned in the width direction.

A sliding lip portion 34 is projected from the projecting stripe 33 of the under seal 30 to the guide rail 1 side. This sliding lip portion 34 comes in slide contact with the side face of the guide rail 1 so that the under surface of the slider main body 2A is sealed.

In the first embodiment, elastic lip portions 35 are arranged in two positions in portions of the under seal 30 coming in contact with the under surface of the slider main body 2A, and are separated from each other in the width direction of the under seal 30. The elastic lip portion 35 has a length approximately equal to that of the axial length of the slider main body 2A and elastically comes in contact with the slider main body 2A with a slight interference.

In the first embodiment, the elastic lip portion 35 arranged in a portion of the under seal 30 coming in contact with the under surface of the slider main body 2A and having the length approximately equal to the axial length of the slider main body 2A thus comes in contact with the under surface of the slider main body 2A with elastic force. Therefore, the close attaching property of the slider main body 2A and the under seal 30 is raised. Thus, it is possible to prevent a gap from being generated between the slider main body 2A and the under seal 30 and the invasion of foreign matters, etc. without fixing the under seal 30 to the slider main body 2A by a rivet.

Further, since the structure for holding the under seal 30 by the end cap 5 without using the rivet in the fixation of the under seal 30 is adopted, the under seal 30 is easily attached and detached from the slider main body 2A. Further, it is possible to set cost of hole processing using rivet attachment, assembly of the under seal, exchange, etc. to be unnecessary.

Second Embodiment

A linear guide as a second embodiment of the present invention will next be explained with reference to FIG. 8.

Figure 8:
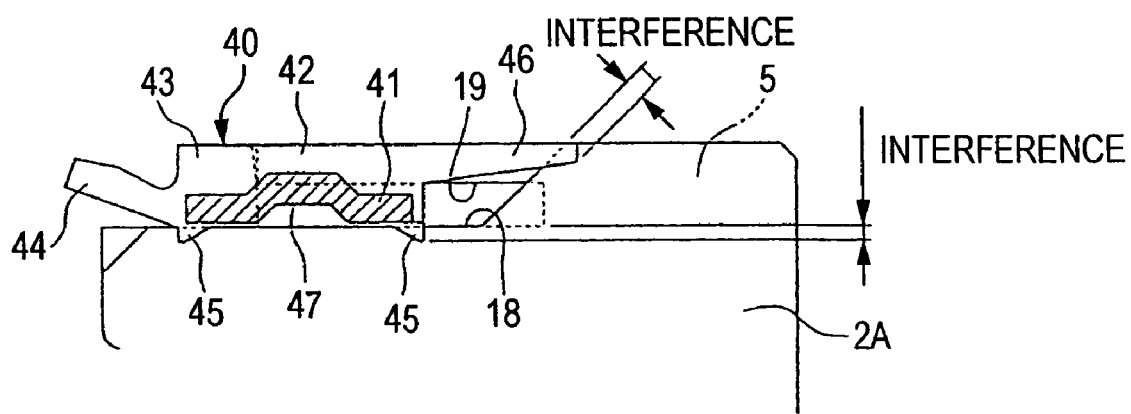
FIG. 8 is an enlarged sectional view for explaining the main portion of a linear guide in a second embodiment of the present invention.
Figure 9:
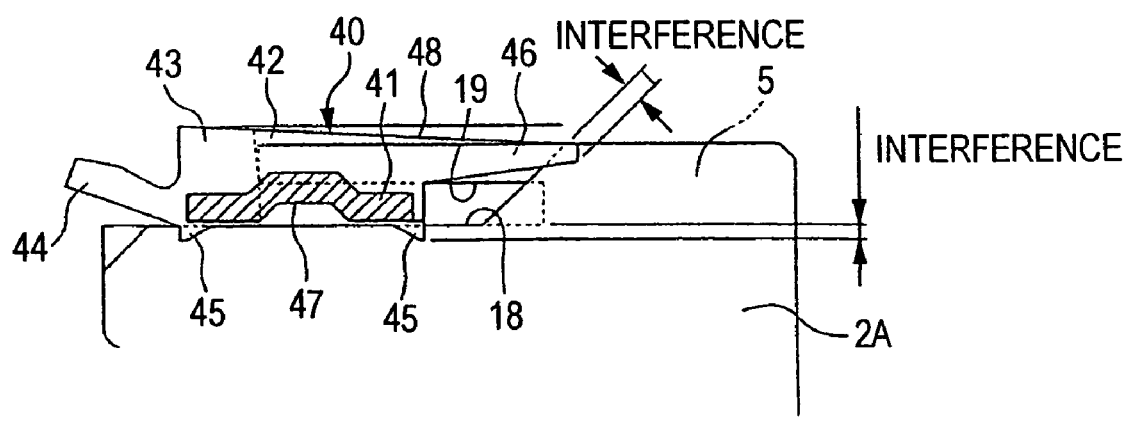
FIG. 9 is an enlarged sectional view for explaining the main portion of a linear guide in a third embodiment of the present invention.
Figure 10:
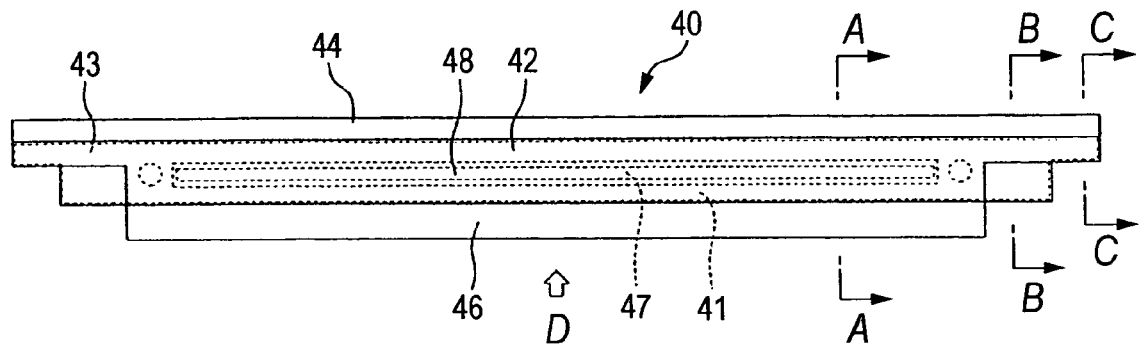
FIG. 10 is a plan view of the under seal.
Figure 11:
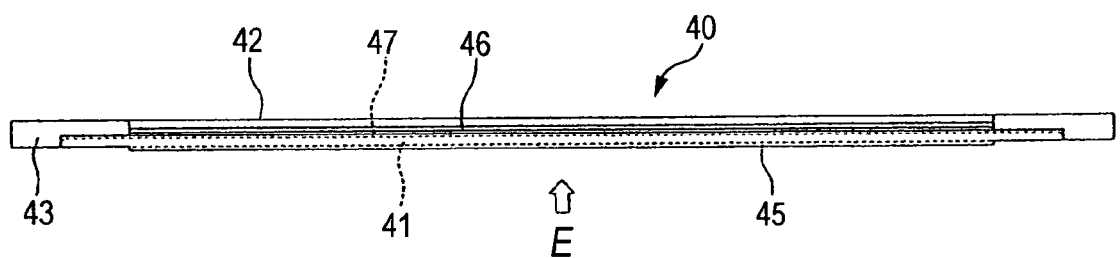
FIG. 11 is a view seen from the direction of an arrow D of FIG. 10.
Figure 12:
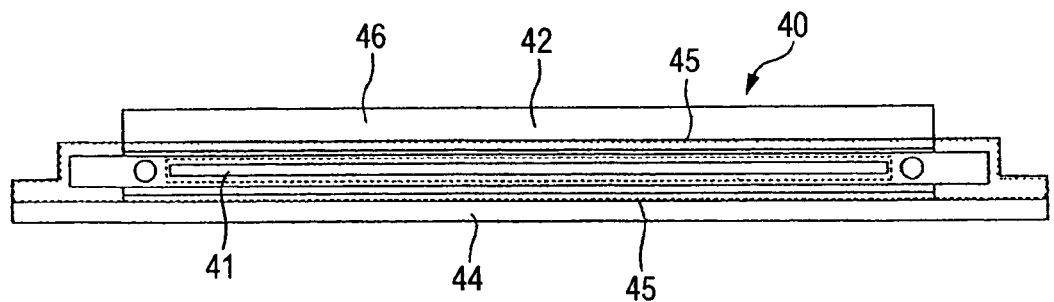
FIG. 12 is a view seen from the direction of an arrow E of FIG. 11.
Figure 13:
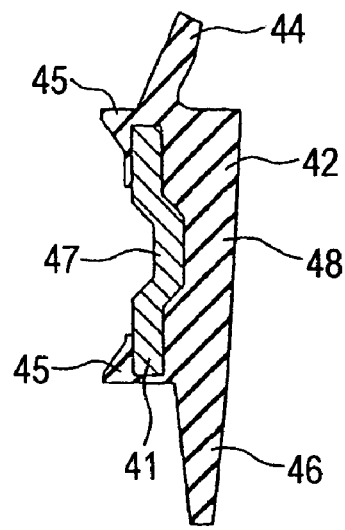
FIG. 13 is an A-A line enlarged sectional view of FIG. 10.
Figure 14:
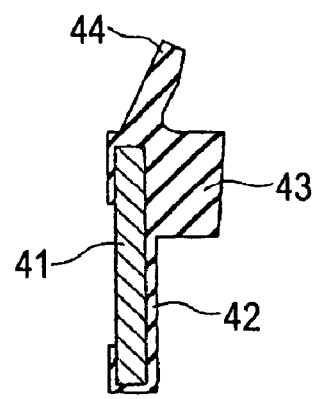
FIG. 14 is a B-B line enlarged sectional view of FIG. 10.
Figure 15:
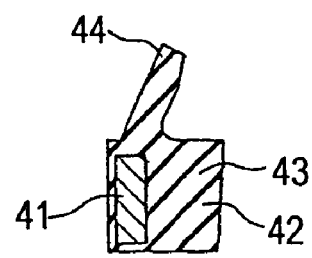
FIG. 15 is a C-C line enlarged sectional view of FIG. 10.
Figure 16:
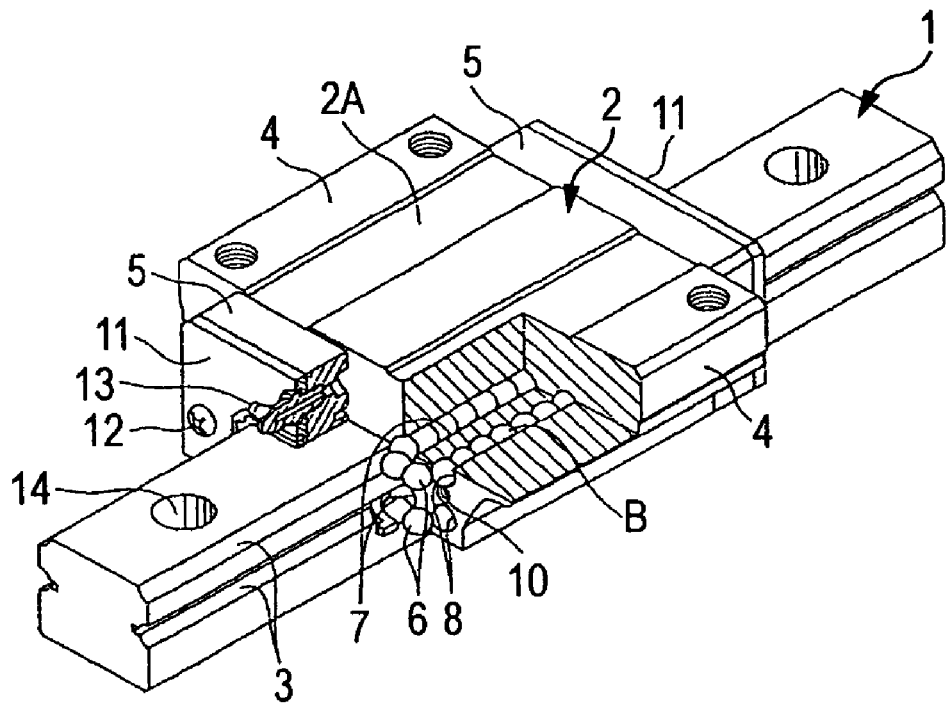
FIG. 16 is a partially broken perspective view for explaining a related linear guide.
Figure 17:
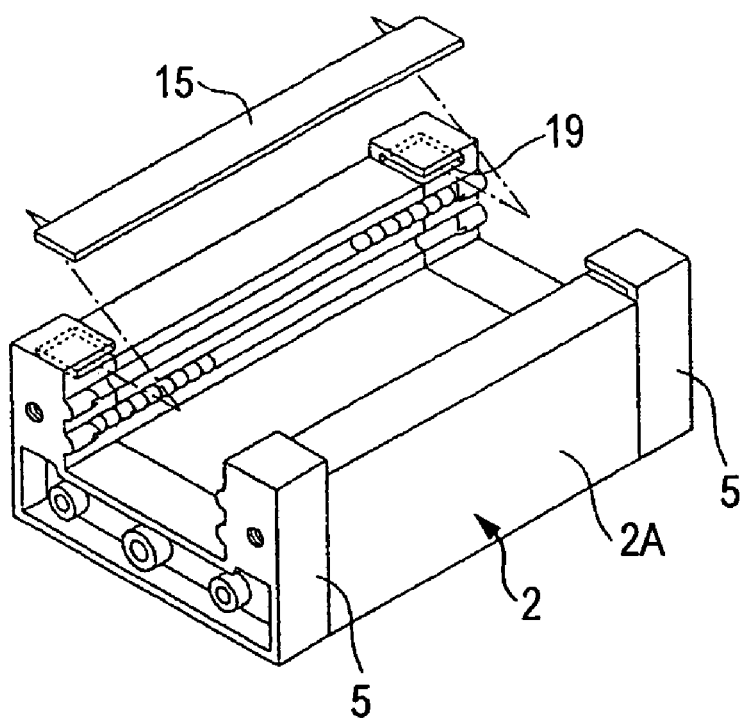
FIG. 17 is an exploded perspective view of a slider main body and the under seal.
Figure 18:
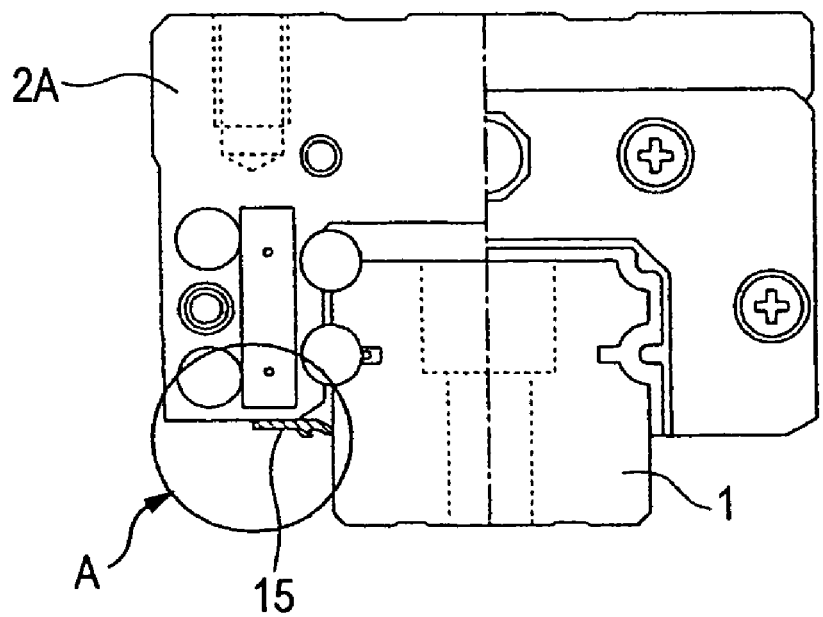
FIG. 18 is a partially broken view for explaining the linear guide attaching the related under seal thereto.
Figure 19:
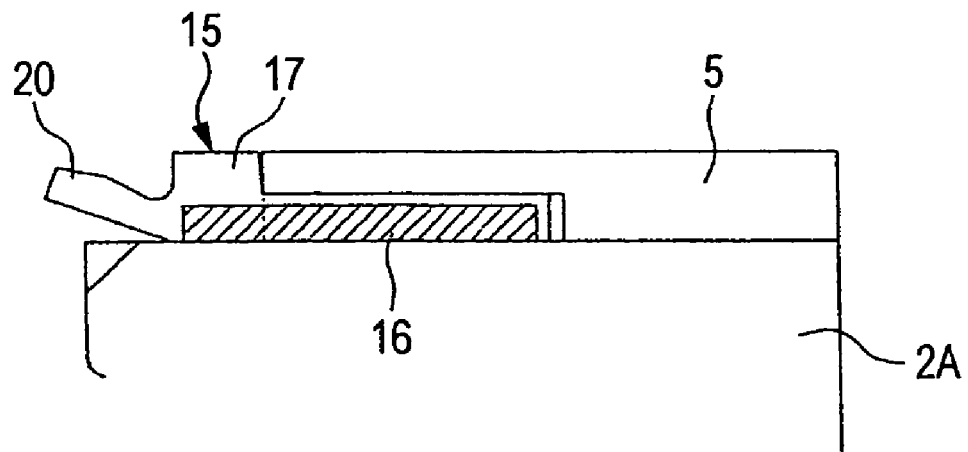
FIG. 19 is an A-portion enlarged sectional view of FIG. 18.
Figure 20:
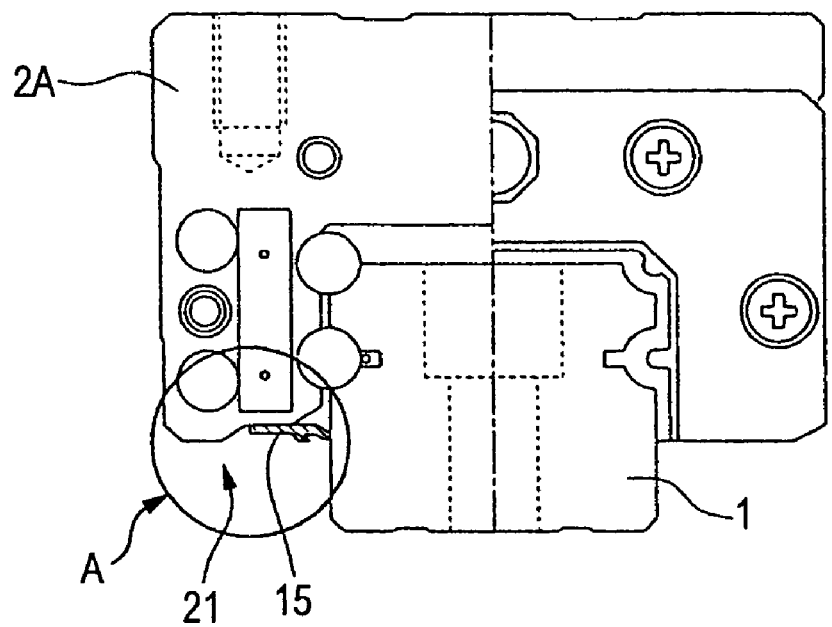
FIG. 20 is a partially broken view for explaining the linear guide attaching the related under seal thereto.
Figure 21:
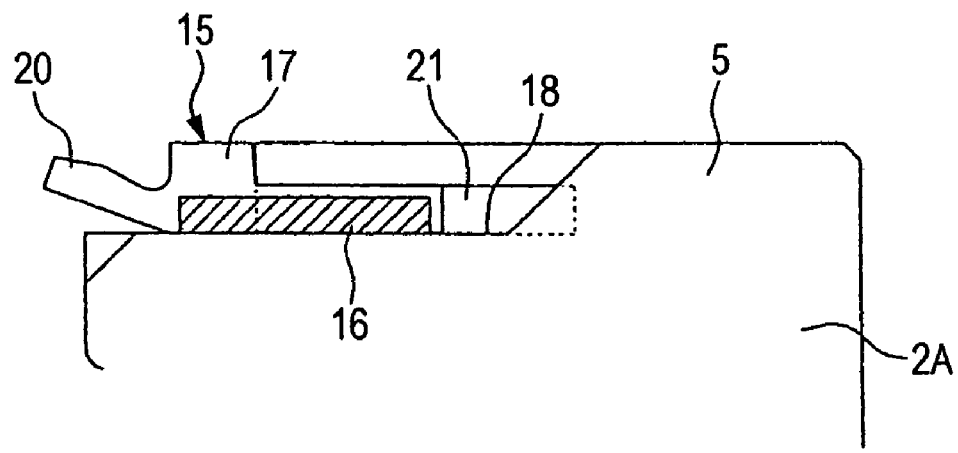
FIG. 21 is an A-portion enlarged sectional view of FIG. 20.
Figure 22:
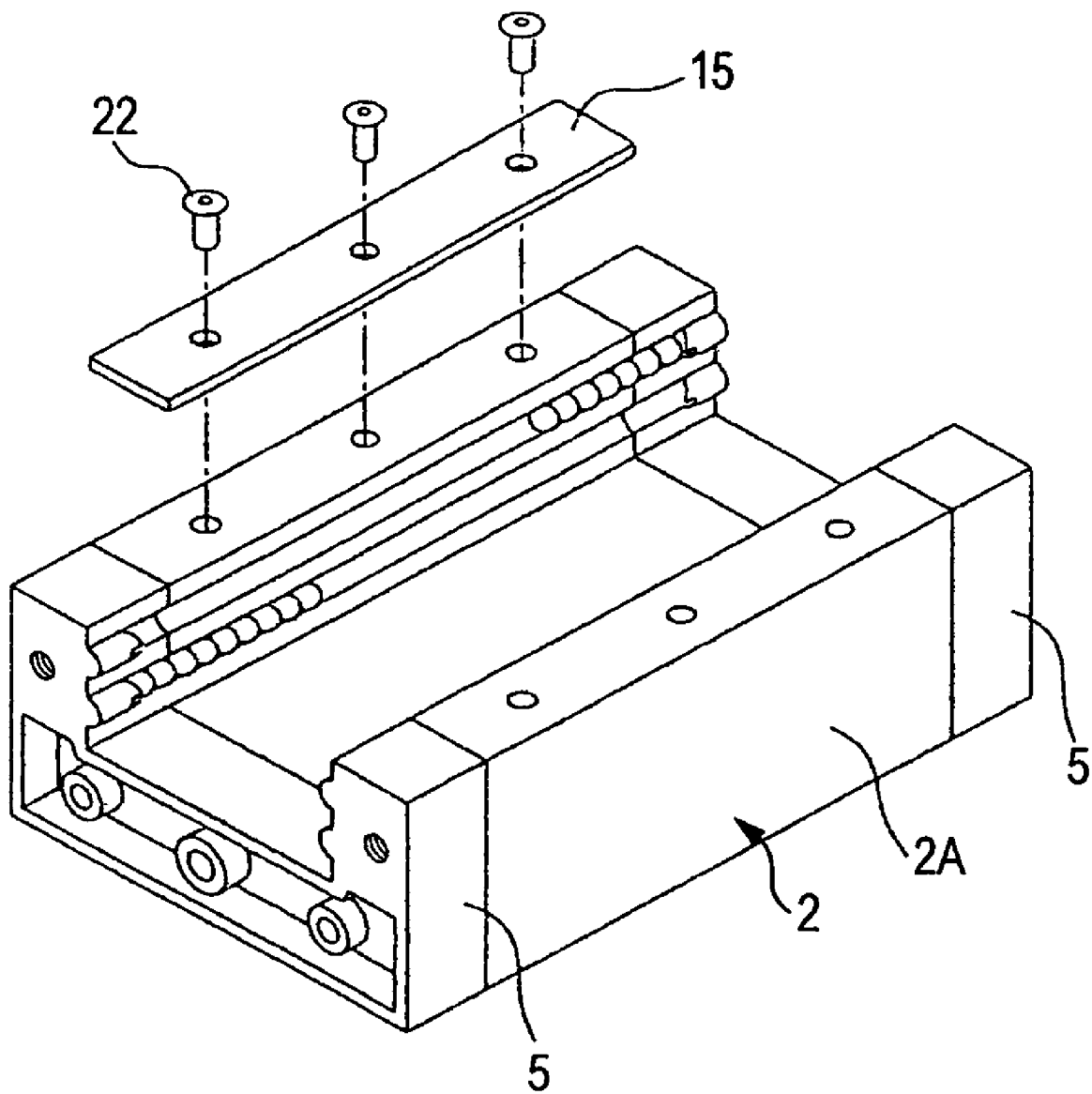
FIG. 22 is an exploded perspective view of the slider main body and the under seal fixed by a rivet.

In the linear guide of the second embodiment of the present invention, as shown in FIG. 8, an under seal 40 coming in slide contact with the side face of the guide rail 1 and sealing the under surface of the slider main body 2A has a core bar 41 of a long plate shape long in the axial direction of the slider main body 2A and a rubber seal 42 fixedly attached to the core bar 41. Both end portions of the under seal 40 are inserted and held in a holding groove 19 arranged in the end cap 5 in a state arranged in a storing concave portion 18 concavely arranged on the under surface of the slider main body 2A. A projecting stripe 43 extending along the axial direction of the slider main body 2A is formed on the width direction inside (guide rail 1 side) of the under seal 40. This projecting stripe 43 comes in contact with the end cap 5 so that the under seal 40 is positioned in the width direction.

A sliding lip portion 44 is projected from the projecting stripe 43 of the under seal 40 to the guide rail 1 side. This sliding lip portion 44 comes in slide contact with the side face of the guide rail 1 so that the under surface of the slider main body 2A is sealed.

Similar to the above first embodiment, elastic lip portions 45 are arranged in two positions in portions of the under seal 40 coming in contact with the under surface of the slider main body 2A, and are separated from each other in the width direction of the under seal 40. The elastic lip portion 45 has a length approximately equal to the axial length of the slider main body 2A and elastically comes in contact with the slider main body 2A with a slight interference.

In the second embodiment, an elastic lip portion 46 is arranged outside (the side separated from the sliding lip portion 44) the under seal 40 in the width direction so as to cover the storing concave portion 18. The elastic lip portion 46 has a length approximately equal to the axial length of the slider main body 2A, and elastically comes in contact with a slanting face portion of the storing concave portion 18 with a slight interference.

Further, in the second embodiment, a shape for raising the rigidity of the under seal 40 is formed by arranging a convex step portion 47 approximately in the central portion of the core bar 41.

Thus, in the second embodiment, when the under seal 40 is arranged in the storing concave portion 18 concavely arranged on the under surface of the slider main body 2A, the elastic lip portion 46 is arranged so as to cover this storing concave portion 18 and the tip of this elastic lip portion 46 comes in contact with the slanting face portion of the storing concave portion 18 with elastic force so that the concave portion can be removed from the under surface of the slider main body 2A. Accordingly, when the linear guide is particularly used upside down, etc., it is possible to prevent foreign matters, etc. from being collected in the above concave portion.

Further, the tip of the elastic lip portion 46 arranged so as to cover the storing concave portion 18 comes in contact with the slanting face portion of the storing concave portion 18 with elastic force. Therefore, the close attaching property of the under seal 40 and the slider main body 2A is raised. It is thus possible to prevent a gap from being generated between the slider main body 2A and the under seal 40 and prevent the invasion of foreign matters, etc.

Further, since the rigidity of the under seal 40 is raised by arranging the convex step portion 47 approximately in the central portion of the core bar 41 of the under seal 40, the deformation of the under seal 40 can be prevented. Thus, it is possible to prevent a gap from being generated between the slider main body 2A and the under seal 40 and prevent the invasion of foreign matters, etc. The other operations and effects are similar to those of the above first embodiment.

Third Embodiment

A linear guide as a third embodiment of the present invention will next be explained with reference to FIGS. 9 to 15.

In the third embodiment, a face of the under seal 40 on the side opposed to the face coming in contact with the under surface of the slider main body 2A is set to an inclination face 48 gradually lowered from the side face of the guide rail 1 toward the side face of the slider main body 2A with respect to the above second embodiment. Thus, the effect for preventing the foreign matters from being collected in the under seal 40 is further raised. The other constructions, operations and effects are similar to those of the above second embodiment.

The linear guide of the present invention is not limited to each of the above embodiments, but can be suitably changed in the scope not departing from the gist of the present invention.

For example, the position of the elastic lip portion arranged in the under seal is not limited to each of the above embodiments, but is arbitrary. Further, the elastic lip portions may be also arranged in one, two or more places.

Further, in each of the above embodiments, the linear guide using the ball B as a rolling element is adopted as an example, but the present invention is not limited to this linear guide. The present invention may be also applied to a linear guide using a roller as the rolling element.

What is claimed is:

1. A linear guide, comprising:
   a guide rail which has a first rolling element rolling groove extending in an axial direction; and
   a slider which has a second rolling element rolling groove opposed to the first rolling element rolling groove of the guide rail and is laid across the guide rail so as to relatively move along the axial direction through rolling movements of a plurality of rolling elements disposed between the first rolling element rolling groove and the second rolling element rolling groove,
   wherein the slider has:
   a slider main body which has a rolling element passage extending through the slider main body in the axial direction and the slider main body having a flat bottom surface;
   an end cap which has a direction changing passage in a curved shape for communicating the rolling element passage, a passage formed by the first and second rolling element rolling grooves and a recessed portion, and is fixed to an axial end portion of the slider main body; and
   an under seal which is arranged on an under surface of the slider main body along the axial direction, comes in slide contact with the guide rail, and seals the under surface of the slider main body, and the under seal has a core bar which has a common plane which extends parallel to the flat bottom surface of the slider main body, and
   the under seal has two rows of elastic lip portions, in a portion of the under seal coming in contact with the slider main body, which have a length approximately equal to an axial length of the slider main body and elastically contact the slider main body;
   wherein the elastic lip portions protrude toward the slider main body from the common plane of the under seal, and
   wherein the two rows of the elastic lip portions, which oppose to the slider, are provided on the same surface of the under seal.

2. The linear guide according to claim 1,
   wherein the core bar comprises a convex step portion is arranged approximately in a central portion of the core bar.

3. The linear guide according to claim 1, wherein the first row of the elastic lip portions is provided on a portion of the under seal that is adjacent to a side of the guide rail.

4. The linear guide according to claim 3, wherein the second row of elastic lip portions is provided on a portion of the under seal which is further from a side of the guide rail than the first row of elastic lip portions.

* * * * *